215-262. OR RE 3,321 SR
BEST AVAILABLE COPY
C. G. Imlay.
Fruit Jar.
No. 3,321. Reissued Mar. 2, 1869.
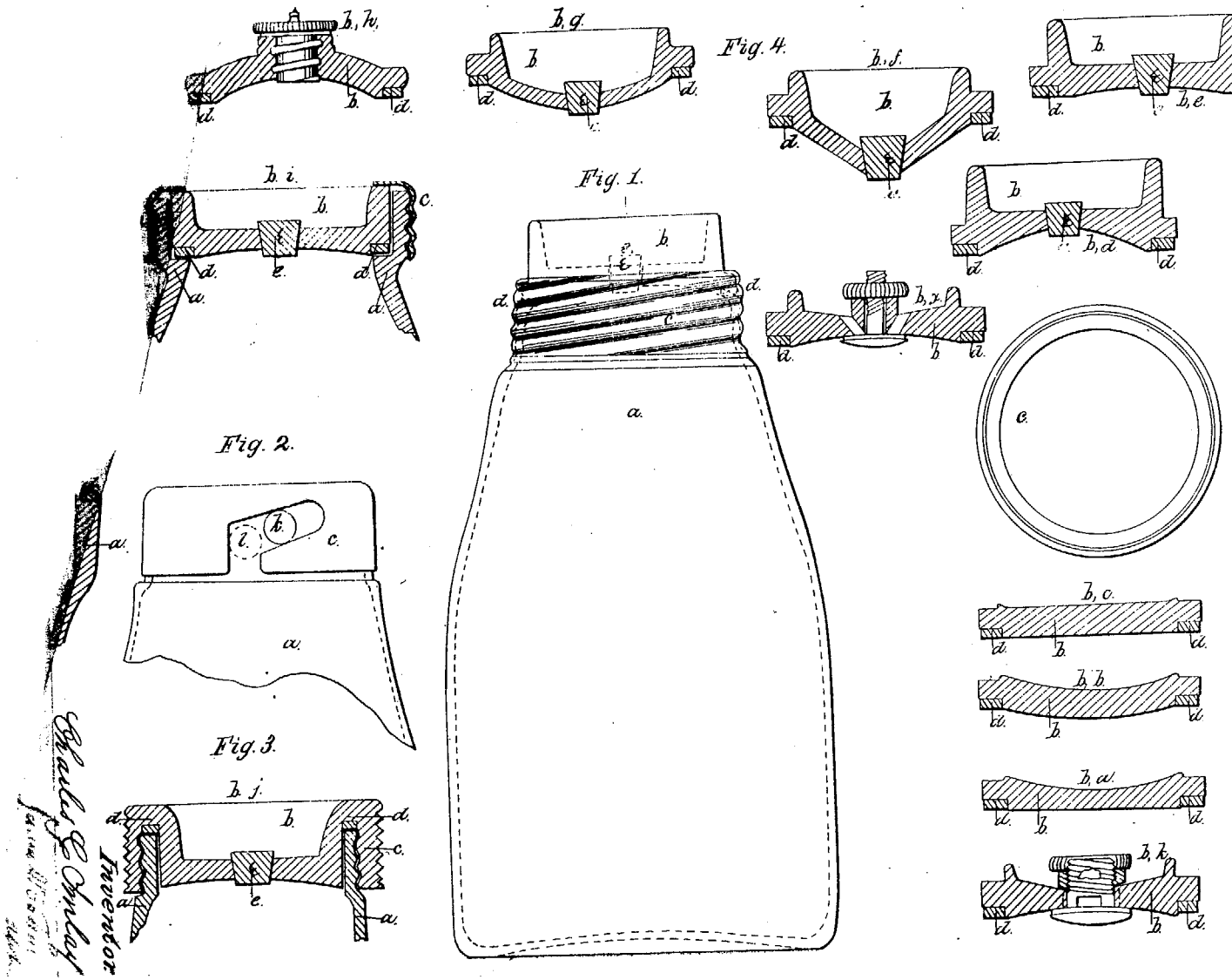
Inventor.
Charles G. Imlay
James D. Foster
Atty.

BEST AVAILABLE COPY

UNITED STATES PATENT OFFICE.

S. B. ROWLEY, OF PHILADELPHIA, PENNSYLVANIA, ASSIGNEE, BY MESNE ASSIGNMENTS, OF CHAS. G. IMLAY.

IMPROVED FRUIT-JAR.

Specification forming part of Letters Patent No. 47,834, dated May 23, 1865; antedated December 6, 1864; Reissue No. 3,321, dated March 2, 1869.

*To all whom it may concern:*

Be it known that CHAS. G. IMLAY, of Philadelphia, Pennsylvania, did invent certain Improvements in Fruit-Jars, for which Letters Patent were granted to him May 23, 1865, antedated December 6, 1864; and that I, S. B. ROWLEY, assignee, by mesne assignments, of the said IMLAY, hereby declare the following to be a full, clear, and exact description of the said invention, which consists of a fruit-jar having on its neck a continuous screw-thread, in combination with an annular nut or screw-ring having an internal flange, and made of thin yielding metal, the said ring serving to confine a cover and packing to the jar, all substantially as described hereinafter, so that the said ring may yield and accommodate itself to any inequalities of the threaded jar and cover, and serve, with the latter and the packing, as an effective medium for closing the mouth of the jar.

I will now proceed to describe the invention of the said C. G. IMLAY, reference being had to the accompanying drawing, which forms a part of this specification, and in which—

Figure 1 represents the exterior of the jar with the said improvement. Figs. 2 and 3 are sections representing modifications, which I do not here claim as parts of the present invention, and will therefore not refer to hereinafter.

The remaining figures illustrate different styles of covers or stoppers which may be used in connection with the invention, the main feature of which is a screw-ring or annular nut, *c*, made of thin sheet metal, and adapted to a continuous screw-thread formed on the neck of the glass jar *a*. This screw-ring has at the top an internal flange, which, bearing on any of the covers *b*, serves to depress the latter on screwing down the ring, and compress the packing or gasket *d* onto a bearing formed for its reception on the jar *a*. The cover may be of any desired shape, provided it is so constructed as to be acted on by the internal flange of the screw-ring. As this ring is made of thin metal it will yield to any inequalities of the screw-thread on the neck of the jar, and also to inequalities of the cover.

I do not claim, broadly, as the invention of the said C. G. IMLAY an annular nut or screw-ring for confining a cover and packing to a fruit-jar, as a rigid ring is shown in the patent granted to me as assignee of G. H. Myers, December 22, 1868, the application for the said invention having been originally filed August 5, 1856; nor do I claim a thin metal screw-cap adapted to screw-threads on the neck of a vessel, as this has been heretofore used; nor is the invention of the said IMLAY limited to any specific cover or to any determined arrangement or disposal of packing-ring; but

I claim as his invention and desire to secure by reissued Letters Patent—

A fruit-jar having on its neck a continuous screw-thread, in combination with an annular nut or screw-ring made of thin yielding metal, all as set forth, for the purpose specified.

In testimony whereof I have signed my name to this specification before two subscribing witnesses.

S. B. ROWLEY.

Witnesses:

[illegible]

[illegible]